United States Patent [19]

Miura et al.

[11] Patent Number: 4,985,171
[45] Date of Patent: Jan. 15, 1991

[54] ANTHRAQUINONE TYPE COMPOUND AND LIQUID CRYSTAL COMPOSITION CONTAINING SUCH COMPOUND

[75] Inventors: Konoe Miura, Yokohama; Tetsuo Ozawa, Hatano; Junko Kanaya, Akita, all of Japan

[73] Assignee: Mitsubishi Chemical Industries Limited, Tokyo, Japan

[21] Appl. No.: 459,958

[22] Filed: Jan. 2, 1990

Related U.S. Application Data

[63] Continuation of Ser. No. 71,791, Jun. 18, 1987, abandoned.

[30] Foreign Application Priority Data

Oct. 29, 1985 [JP] Japan .................. 60-243601
Oct. 29, 1985 [JP] Japan .................. 60-243602
Oct. 29, 1985 [JP] Japan .................. 60-243603
Dec. 23, 1985 [JP] Japan .................. 60-290240

[51] Int. Cl.$^5$ ............ C09K 19/00; G02F 1/13; C07D 401/00; C07D 475/00
[52] U.S. Cl. ................ 352/299.1; 350/349; 552/234; 552/289; 544/261; 544/285; 544/294; 544/299; 546/276; 546/285
[58] Field of Search .......... 252/299.1; 350/349; 552/234, 289; 544/261, 285, 294, 299; 546/276, 285

[56] References Cited

U.S. PATENT DOCUMENTS 4,446,047 5/1984 Thompson .................. 252/299.1
4,455,253 6/1984 Thompson .................. 252/299.1

FOREIGN PATENT DOCUMENTS 3314467 4/1983 Fed. Rep. of Germany ... 252/299.1
5792080 6/1982 Japan .................. 252/299.1
2043097 7/1981 United Kingdom ......... 252/299.1

OTHER PUBLICATIONS

European Search Report Dated 8/2/90.

*Primary Examiner*—John S. Maples
*Assistant Examiner*—Philip Tucker
*Attorney, Agent, or Firm*—Oblon, Spivak, McClelland, Maier & Neustadt

[57] ABSTRACT

An anthraquinone type compound which is represented by the following general formula (I) and which exhibits yellow to orange-colored hue; and a composition for liquid crystal display element obtained by dissolving the compound into liquid crystal:

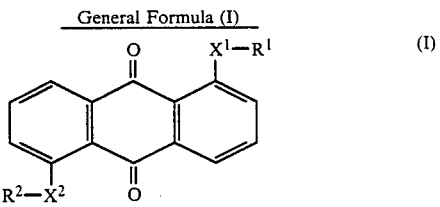

General Formula (I)

(where: $X^1$ and $X^2$ denote sulfur or selenium; and $R^1$ and $R^2$ represent a substituted or unsubstituted phenyl group, a substituted or unsubstituted naphthyl group, a substituted or unsubstituted pyridyl group, a substituted or unsubstituted pyrmidyl group or a tetrahydronaphthyl group, with the following exceptions:

(1) $X^1=X^2=S$; $R^1=R^2=$a substituted or unsubstituted phenyl group
(2) $X^1=X^2=S$; $R^1=$a substituted or unsubstituted naphthyl group; $R^2=$a phenyl group or a naphthyl group
(3) $X^1=X^2=Se$; $R^1=R^2=$a tetrahydronaphthyl group).

8 Claims, No Drawings

ANTHRAQUINONE TYPE COMPOUND AND LIQUID CRYSTAL COMPOSITION CONTAINING SUCH COMPOUND

This is a continuation of application Ser. No. 071,791, filed on June 18, 1987, now abandoned.

TECHNICAL FIELD

This invention relates to a novel anthraquinone type compound and a liquid crystal composition containing such compound.

BACKGROUND ART

There has so far been known to effect color display in utilization of the guest-host effect between a pigment compound and liquid crystal by interposing between a pair of mutually opposing electrodes a liquid crystal composition prepared by dissolving a pigment compound into liquid crystal.

The pigment compound to be used for such liquid crystal composition is required to have, among other things, high dichroic ratio, high solubility to the liquid crystal, and other properties.

Thus, use of anthraquinone type compounds exhibiting yellow to orange-colored hue in the liquid crystal composition has been known Japanese Unexamined Patent Publication No. 73067/1982 and Japanese Unexamined Patent Publication No. 158262/1982).

However, these conventionally known anthraquinone type compounds did not always satisfy the properties which are required of the pigment compound to be used in the liquid crystal composition as mentioned above.

DISCLOSURE OF THE INVENTION

The present invention aims at providing anthraquinone compounds which exhibit high dichroic ratio and good solubility to the liquid crystal, as well as liquid crystal compositions which are capable of exhibiting good color display.

With a view to attaining such objective, the present inventors conducted repeated studies and researches, as the result of which they have come to a finding that, by introduction of the thio group into the first or fifth position of the anthraquinone nucleus of the anthraquinone type pigment compounds, the compounds exhibit high dichroic ratio and good solubility to liquid crystal, and that liquid crystal compositions containing such pigment compounds perform satisfactory color display. Based on this finding, they have arrived at the present invention.

The present invention has its gist in providing anthraquinone type compounds and liquid crystal compositions containing such compounds, which are represented by the following general formula (I):

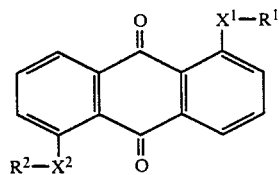

(wherein $X^1$ and $X^2$ denote sulfur or selenium; and $R^1$ and $R^2$ represent a substituted or unsubstituted phenyl group, a substituted or unsubstituted naphthyl group, a substituted or unsubstituted pyridyl group, or a substituted or unsubstituted pyrimidyl group or a tetrahydronaphthyl group: provided that, when $X^1$ and $X^2$ are sulfur, there is no possibility of $R^1$ and $R^2$ being simultaneously a substituted or unsubstituted phenyl group, that when $R^1$ is the substituted or unsubstituted naphthyl group, $R^2$ is not a phenyl group or a naphthyl group, and that when $X^1$ and $X^2$ are selenium, both $R^1$ and $R^2$ are not simultaneously a tetrahydronaphthyl group).

BEST MODE FOR CARRING OUT THE INVENTION

In the following, detailed explanations will be given as to the structure of the anthraquinone type compounds according to the present invention, which is represented by the above-indicated general formula (I).

The substituents for the phenyl group, the naphthyl group, the pyridyl group and the pyrimidyl group represented by $R^1$ and $R^2$ in the general formula (I) are as follows: an alkyl group; an alkoxy group; a hydroxy group; a halogen; those groups represented by $-O-(-CH_2O)_{\overline{m}}R^3$ (wherein m is an integer of 1 to 5; $R^3$ denotes a alkyl group); those groups represented by $-(-CH=CH)_{\overline{n}}COOR^4$ (wherein n is an integer of 0 or 1; $R^4$ denotes an alkyl group, those groups represented by $-(-CH_2CH_2O)_{\overline{m}}R^3$, an aryl group, a cycloalkyl group, or a trans-4-alkylcyclohexyl group); an aryl group; a cycloalkyl group; a trans-4-alkylcyclohexyl group; and so forth. As the alkyl group in these substituents, there may be exemplified those alkyl groups having the carbon content of from 1 to 18. Such alkyl groups may further contain therein other substituents, for example, carboxylic acid ester, etc. Also, as the above-mentioned alkoxy group, there may be exemplified those alkoxy groups having the carbon content of from 1 to 18. As the halogens, there may be exemplified fluorine, chlorine, bromine, and others.

As the aryl group, there may be exemplified a phenyl group, a 4-alkyl (e.g. alkyl having the carbon content of from 1 to 13) phenyl group, a 4-alkoxy (e.g. alkoxy having the carbon content of from 1 to 13) phenyl group, a biphenyl group, a cyclohexyl-phenyl group, a trans-4-alkyl (e.g. alkyl having the- carbon content of from 1 to 13) cyclohexyl phenyl group, and so forth. As the cycloalkyl group, there may be exemplified a cyclohexyl group, a cyclopentyl group, a cycloheptyl group, and so forth. As the trans-4-alkylcyclohexyl group, there may be exemplified a trans-4-alkyl (e.g. alkyl having the carbon content of from 1 to 13) cyclohexyl group, and so on. By the way, the above-mentioned alkyl group or alkoxy group having the carbon content of 3 or more may be in the form of either the straight chain or the branched chain.

In the following, explanations will be given in further detail as to the compound of the present invention as shown by the general formula (I).

The compound according to the present invention includes those anthraquinone type compounds represented by the following general formulae (II) to (V).

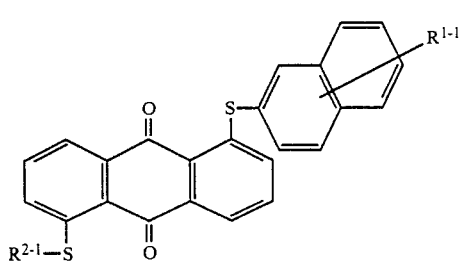

(wherein $R^{1-1}$ denotes hydrogen, an alkyl group, an alkoxy group, a hydroxy group, a halogen, or a carboxylic acid ester group; $R^{2-1}$ denotes a phenyl group containing therein a substituent, a naphthyl group containing therein a substituent group, or a pyridyl or pyrimidyl group which may contain therein a substituent).

The substituents contained in the above-mentioned phenyl group containing therein the substituent, which is represented by $R^{2-1}$, are the same as those exemplified in $R^1$ and $R^2$ of the above-indicated general formula (I). Also, as the substituents for the above-mentioned naphthyl group, there may be exemplified an alkyl group, an alkoxy group, a hydroxy group, a halogen, or a carboxylic acid ester group, and so on. As the substituents for the above-mentioned pyridyl group or pyrimidyl group, there may be exemplified an alkyl group, an alkoxy group, and so on. In the compounds of the general formula (II), $R^{1-1}$ should preferably be hydrogen and $R^{2-1}$ should preferably be the substituted phenyl group; in particular, $R^{2-1}$ should preferably be a phenyl group substituted by an alkyl group, preferably the alkyl group having the carbon content of from 3 to 8, or more preferably the alkyl group having the carbon content of 4 or 5).

An anthraquinone type compound represented by the general formula (III):

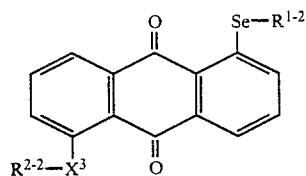

(wherein $X^3$ denotes sulfur or selenium; and $R^{1-2}$ and $R^{2-2}$ denotes a phenyl, naphthyl, pyridyl or pyrimidyl group, which may contain therein substituent group).

The substituents for the above-mentioned phenyl group, naphthyl group, pyridyl group and pyrimidyl group are the same as those substituents listed in the above general formula (II).

Compounds of the above formula (III), wherein $X^3$ is sulfur; $R^{1-2}$ is a phenyl group or a phenyl group substituted by a lower alkyl group, a lower alkoxy group or a halogen; and $R^{2-2}$ is a phenyl group or a phenyl group substituted by an alkyl group, an alkoxy group, a halogen, a 4-alkylcyclohexyloxycarbonyl group, a cyclohexyl group, an alkylphenyl group, or a 4-alkylcyclohexyloxycarbonyl-substituted alkenyl group, a naphthyl group; a pyridyl group, or a lower alkyl-substituted pyrimidyl group, are particularly effective.

An anthraquinone type compound represented by the general formula (IV):

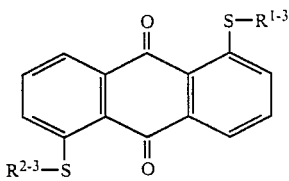

(where: $R^{1-3}$ denotes a pyridyl or pyrimidyl group which may contain therein a substituent; $R^{2-3}$ denotes a phenyl, pyridyl, or pyrimidyl group which may contain therein a substituent).

The substituents for the above-mentioned phenyl group, pyridyl group and pyrimidyl group are the same as those in the general formula (II).

Compounds of the above formula (IV), wherein $R^{1-3}$ is a pyridyl group or a lower alkyl-substituted pyrimidyl group; and $R^{2-3}$ is a phenyl group substituted by an alkoxy group, an alkyl group, a halogen, a 4-alkyl-phenyl group, a 4-alkylphenyloxycarbonyl-substituted alkenyl group, a trans-4-alkylcyclohexyloxycarbonyl group or an alkoxyalkoxycarbonyl-substituted alkenyl group, a phenyl group, a pyridyl group, or a lower alkyl-substituted pyrimidyl group, are particularly effective.

An anthraqinone type compound represented by the general formula (V):

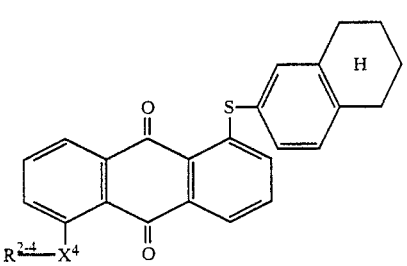

(wherein $X^4$ denotes sulfur or selenium; and $R^{2-4}$ denotes a phenyl, naphthyl, pyridyl or pyrimidyl group which may contain therein substituent group, or a tetrahydronaphthyl group).

The substituents for the above-mentioned phenyl group, naphthyl group, pyridyl group and pyrimidyl group the same as those in the above general formula (II).

A compound of the above formula (V), wherein $X^4$ is selenium, and $R^{2-4}$ is a phenyl group, is particularly effective.

The anthraquinone type compound represented by the above-indicated general formula (I) may be synthesized by a method represented, for example, by the following reaction formula:

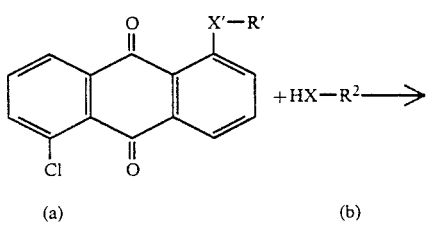

-continued

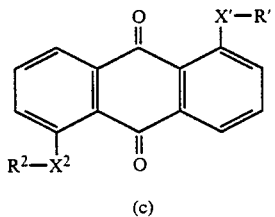

(c)

[$X^1$, $X^2$, $R^1$ and $R^2$ in the general formulae (a), (b) and (c) of the above reaction formula have the same meaning as those in the above-indicated general formula (I)].

The synthesizing method represented by the above reaction formula can be carried out by use of an amide type solvent such as N,N-dimethylformamide, acetamide, N-methylpyrrolidone; or a solvent such as dimethylsulfoxide, sulforan, at a temperature condition ranging from 50° C. to 200° C., preferably from 80° C. to 150° C., in the presence of an acid binding agent, for example, an alkali metal carbonate such as potassium carbonate or sodium carbonate; alkali metal hydroxide such as sodium hydroxide or potassium hydroxide; acetate such as potassium acetate or sodium acetate; or an organic acid binding agent such as triethylamine.

The nematic liquid crystal to be used for the liquid crystal composition according to the present invention may be selected from fairly broad varieties, provided that they are able to exhibit the nematic state within a range of their operating temperatures. It may also be possible that such a nematic liquid crystal is caused to assume the cholesteric state by addition thereto of an optically active substance to be described later. As the nematic liquid crystal, there may be exemplified those substances as shown in No. 1 to No. 3 of the following Table 1 or their derivatives.

TABLE 1

| No. | Type of Liquid Crystal | Example |
|---|---|---|
| 1 | Cyclohexyl-cyclohexane type | $R^a$—[H]—[H]—X |
| 2 | Phenyl-cyclohexane type | $R^a$—[H]—[phenyl]—X |
| 3 | Biphenyl type | $R^a$—[phenyl]—[phenyl]—X |
| 4 | Terphenyl type | $R^a$—[phenyl]—[phenyl]—[phenyl]—X |
| 5 | Cyclohexy-cyclohexanate type | $R^a$—[H]—COO—[H]—X |
| 6 | Phenylcyclohexyl-carboxylate type | $R^a$—[H]—COO—[phenyl]—X |
| 7 | Ester type | $R^a$—[phenyl]—COO—[phenyl]—X |
| 8 | Diester type | $R^a$—[phenyl]—COO—[phenyl]—COO—[phenyl]—X <br> X—[phenyl]—COO—[phenyl]—COO—[phenyl]—$R^a$ |

TABLE 1-continued

| No. | Type of Liquid Crystal | Example |
|---|---|---|
| 9 | Biphenyl cyclohexyl carboxylate type | R$^a$—(cyclohexyl)—COO—(phenyl)—(phenyl)—X |
| 10 | Biphenyl ester type | R$^a$—(phenyl)—(phenyl)—COO—(phenyl)—X <br> X—(phenyl)—(phenyl)—COO—(phenyl)—R$^a$ |
| 11 | Thioester type | R$^a$—(phenyl)—COS—(phenyl)—X |
| 12 | Schiff type | R$^a$—(phenyl)—CH=N—(phenyl)—X <br> X—(phenyl)—CH=N—(phenyl)—R$^a$ |
| 13 | Pyrimidine type | R$^a$—(phenyl)—(pyrimidine)—X (four isomers shown) |
| 14 | Dioxane type | R$^a$—(dioxane)—(phenyl)—X |
| 15 | Cyclohexyl methylether type | R$^a$—(cyclohexyl)—CH$_2$O—(phenyl)—X <br> R$^a$—(cyclohexyl)—CH$_2$O—(phenyl)—(phenyl)—X |

TABLE 1-continued

| No. | Type of Liquid Crystal | Example |
|---|---|---|
| 16 | Cinnamonitrile type | $R^a$—⟨H⟩—⟨⟩—CH=CH—X |
| 17 | Ethane type | $R^a$—⟨H⟩—CH₂CH₂—⟨⟩—X |
| | | $R^a$—⟨H⟩—CH₂CH₂—⟨⟩—⟨⟩—X |
| | | $R^a$—⟨H⟩—CH₂CH₂—⟨⟩—⟨H⟩—X |

In the above Table 1, $R^a$ denotes an alkyl group or an alkoxy group; and X represents an alkyl group, an alkoxy group, a nitro group, a cyano group, or a hologen.

All the liquid crystals shown in Table 1 above have the positive dielectric anisotropy. However, even those known liquid crystals of ester type, azoxy type, azo type, Schiff type, pyrimidine type, diester type, or biphenyl ester type, the dielectric anisotropy of which is negative, can be used by mixing them with those liquid crystals having the positive dielectric anisotropy so that the mixture has the positive dielectric anisotropy. Further, even those liquid crystals having the negative dielectric anisotropy cna be used as they are, when they are adapted into an appropriate element construction and operated under an appropriate driving mode.

While the host liquid crystal substance to be used for the liquid crystal composition according to the present invention may be selected from any of those liquid crystals shown in Table 1 above or their mixtures, the liquid crystal produced and marketed by Merck & Co. under a tradename of "ZLI-1132"; the liquid crystal produced and marketed by Merck & Co. under a tradename of "ZLI-1565"; and the liquid crystal produced and marketed by British Drug House & Co. under a tradename of "E-7", are recommended as useful.

As the optically active substances to be used in the liquid crystal composition according to the present invention, there may be exemplified, chiral nematic compounds, for example, those compounds having optically active groups such as a 2-methylbutyl group, a 3-methylbutoxy group, a 3-methylpentyl group, a 3-methylpentoxy group, a 4-methylhexyl group, a 4-methylhexoxy group, etc. introduced into the nematic liquid crystals; alcohol derivatives disclosed in Japanese Unexamined Patent Publication No. 45546/1976 such as l-menthol and d-borneol; ketone derivatives such as d-camphor and 3-methyl cyclohexane; carboxylic acid derivatives such as d-citronellic acid and l-camphoric acid; aldehyde derivatives such as d-citronellal; alkene derivatives such as d-linonene; or other optically active substances such as amines, amides and nitrile derivatives.

As the elements for performing the liquid crystal display by use of the liquid crystal composition according to the present invention, there may be used known liquid crystal display elements. In more detail, transparent electrodes of any arbitrary patterns are formed on each of two sheets of glass substrates, at least one of which is transparent, and then these two sheets of glass substrates are arranged in parallel relationship such that the surface sides of the glass substrates, on which the electrodes have been formed, may be mutually opposed with appropriate spacers being interposed between them to construct the liquid crystal display element to be used. In this case, a space gap for the element is determined by the spacers. A preferred range of the space gap for the liquid crystal display element may be from 3 to 100 μm, or more preferably from 5 to 50 μm from the practical standpoint.

EXAMPLES

In the following, the present invention will be explained more concretely in reference to practical examples, although the present invention is not restricted by these examples.

Here, explaining briefly about the order parameter S for indicating the dichroism, it can be empirically found on any pigment compound from the following equation.

$$S = \frac{A// - A\perp}{2A\perp + A//}$$

In the above equation, $A//$ and $A\perp$ respectively denote light absorbances of the pigment with respect to light beams which have been polarized in parallel with and perpendicular to, respectively, the direction of orientation of the liquid crystal.

Specifically, the order parameter S is a value which indicates a display contrast of the guest-host type liquid crystal element, according to which the nearer this value comes theoretically to 1, the less becomes the degree of color remnant in the whitened portion, whereby a clear display of high brightness and contrast can be obtained.

EXAMPLE 1

To 20 ml of N-methylpyrrolidone solution (hereinafter abbreviated as "NMP"), into which 90 mg of potassium hydroxide had been dissolved, there were added 270 mg of p-t-butylthiophenol and 600 mg of a compound represented by the following structural formula:

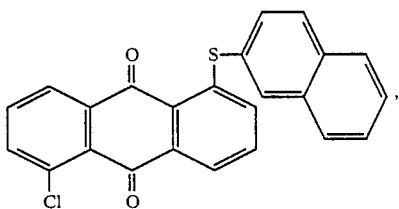

and the batch was agitated for three hours at a temperature ranging from 120° C. to 130° C. After lowering the temperature, the reaction liquid was released into a 30% aqueous solution of sodium chloride. Then, the deposited crystals were filtered and dried, after which they were refined in a column chromatography with silica gel (a product of Wako Junyaku Kogyo Kabushiki Kaisha, under a tradename of "C-200") as a carrier, and chloroform as a separating solvent, by which impurities were removed. As the result, there was obtained 400 mg of a compound represented by the follwing structural formula:

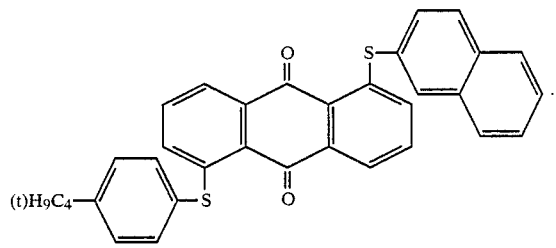

This compound indicated its melting point in a range of from 249.0° C. to 249.5° C.

The anthraquinone type compound (pigment) according to the present invention which had been obtained in the above-described process steps was added to the afore-mentioned mixed liquid crystal ZLI-1565 (the tradename of the product of Merck & Co.), and the batch was heated to a temperature of 70° C. or higher, followed by agitating the same when it assumed a state of isotropic liquid, after which the mixture was left to cool. These process steps were repeated to well dissolve the above-mentioned compound (pigment) into the liquid crystal.

The thus prepared liquid crystal composition according to the present invention was sealed into a space gap of 10 μm of an element composed of a pair of upper and lower glass substrates, each having a transparent electrode and been subjected to treatment, wherein the surface side of the glass substrate in contact with the liquid crystal was coated with a polyamide type resin, and cured, after which the resin was rubbed to have the homogeneous orientation. The above-mentioned liquid crystal within the element as treated for the above-mentioned homogeneous orientation took that homogeneous orientation when no electric voltage was applied to it, and the molecules of the pigment also took the same orientation in accordance with the host liquid crystal.

The thus fabricated guest-host element was measured for its absorption spectrum by use of light polarized in parallel with the direction of orientation of the liquid crystal molecules, and light polarized vertically thereto, from which the maximum absorbing wavelength of the pigment to each of these polarized lights were found. In finding out the absorbance of the pigment, there was made corrections on the absorption by the host liquid crystal and the glass substrates as well as the reflection loss of the element.

Also, using the absorbances $A//$ and $A\perp$ with respect to each of the polarized lights, the values of the order parameter S were calculated based on the afore-mentioned equation of:

$$S = \frac{A// - A\perp}{2A\perp + A//}.$$

The results from the above calculation are shown in No. 1-1 of Table 2 below.

EXAMPLE 2

By the method as described in Example 1 above, there were produced and isolated the anthraquinone type compounds (pigments) according to the present invention, each having the structural formula as shown in No. 1-2 to No. 1-28 in Table 2 below. Using the thus obtained 27 pigment compounds, the maximum absorbing wavelengths (λ max) and the order parameters S thereof were measured and calculated in the same manner as in Example 1 above.

The results from the above calculations are shown in No. 1-2 through No. 1-28 in Table 2 below.

TABLE 2
An anthraquinone type compound of the above-indicated general formula (II):
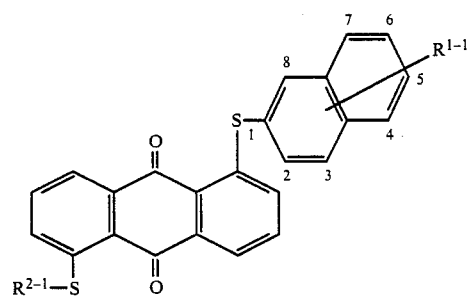
| No. | Position of $R^{1-1}$ | $-R^{1-1}$ | $-R^{2-1}$ | λmax (nm) | Order parameter (S) |
|---|---|---|---|---|---|
| 1-1 | | —H | —C₆H₄—C₄H₉(t) | 463 | 0.77 |
| 1-2 | | —H | —C₆H₄—CH₃ | 463 | 0.76 |
| 1-3 | | —H | —C₆H₄—OC₅H₁₁(n) | 463 | 0.77 |
| 1-4 | | —H | —C₆H₄—Cl | 465 | 0.76 |
| 1-5 | | —H | —C₆H₄—COO—C₆H₁₀(H)—C₅H₁₁(n) (NOTE 1) | 460 | 0.78 |
| 1-6 | | —H | 4-pyridyl | 463 | 0.75 |
| 1-7 | | —H | 2-pyrazinyl | 466 | 0.75 |
| 1-8 | | —H | 4-methyl-2-pyrimidinyl | 456 | 0.75 |
| 1-9 | | —H | —C₆H₄—OC₂H₄OC₂H₅ | 463 | 0.77 |

TABLE 2-continued
An anthraquinone type compound of the above-indicated general formula (II):
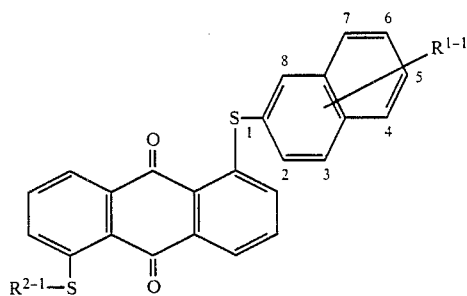
| No. | Position of $R^{1-1}$ | $-R^{1-1}$ | $-R^{2-1}$ | λmax (nm) | Order parameter (S) |
|---|---|---|---|---|---|
| 1-10 | | —H | —⟨⟩—CH=CH—COO—⟨⟩—C$_4$H$_9$(n) | 464 | 0.79 |
| 1-11 | | —H | —⟨⟩—C$_4$H$_9$(n) | 463 | 0.77 |
| 1-12 | 5 | —OH | —⟨⟩—CH$_3$ | 463 | 0.77 |
| 1-13 | 5 | —F | —⟨⟩—C$_4$H$_9$(n) | 463 | 0.77 |
| 1-14 | 5 | —OCH$_3$ | —⟨⟩—C$_4$H$_9$(t) | 463 | 0.77 |
| 1-15 | 4 | —F | —⟨pyridine⟩ | 463 | 0.75 |
| 1-16 | 5 | —Br | —⟨⟩—C$_4$H$_9$(n) | 465 | 0.75 |
| 1-17 | 5 | —COOCH$_3$ | —⟨⟩—C$_4$H$_9$(t) | 461 | 0.76 |
| 1-18 | 6 | —COOCH$_3$ | —⟨⟩—CH$_3$ | 461 | 0.76 |
| 1-19 | 5 | —CH—COOCH$_3$<br>\|<br>CH$_3$ | —⟨pyridine⟩ | 467 | 0.74 |

TABLE 2-continued
An anthraquinone type compound of the above-indicated general formula (II):
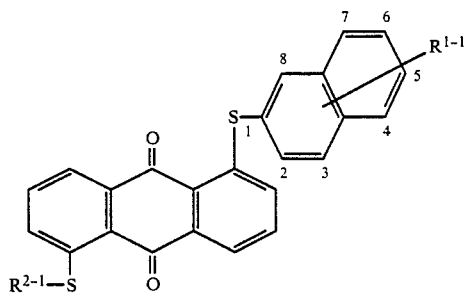
| No. | Position of $R^{1-1}$ | $-R^{1-1}$ | $-R^{2-1}$ | λmax (nm) | Order parameter (S) |
|---|---|---|---|---|---|
| 1-20 | 8 | —C$_4$H$_9$(iso) | —⌬—C$_4$H$_9$(t) | 463 | 0.76 |
| 1-21 | 5 | —OCH$_3$ | —⌬—CH$_3$ | 463 | 0.76 |
| 1-22 | 5 | —OH | —⌬—OC$_2$H$_4$OC$_2$H$_5$ | 463 | 0.77 |
| 1-23 | 5 | —F | —(pyrimidine) | 456 | 0.75 |
| 1-24 | 5 | —OC$_2$H$_5$ | —(naphthyl)—OC$_2$H$_5$ | 468 | 0.78 |
| 1-25 | 6 | —COOC$_2$H$_5$ | —(naphthyl)—COOC$_2$H$_5$ | 468 | 0.78 |
| 1-26 | | H | (iso)H$_9$C$_4$—(naphthyl)— | 468 | 0.78 |
| 1-27 | | H | —(naphthyl)—COOCH$_3$ | 468 | 0.78 |

TABLE 2-continued

An anthraquinone type compound of the above-indicated general formula (II):

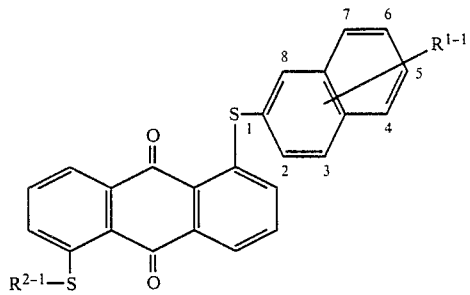

| No. | Position of $R^{1-1}$ | $-R^{1-1}$ | $-R^{2-1}$ | λmax (nm) | Order parameter (S) |
|---|---|---|---|---|---|
| 1-28 | 5 | —OCH$_3$ | ![naphthyl-F] | 468 | 0.78 |

(NOTE 1: —⟨H⟩— represents trans-cyclohexyl.)

EXAMPLE 3

To 20 ml of N-methyl pyrrolidone solution (hereinafter abbreviated as "NMP"), into which 100 mg of potassium hydroxide had been dissolved, there were added 300 mg of p-t-butylthiophenol and 650 mg of a compound represented by the following structural formula:

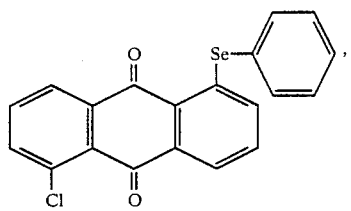

the batch was agitated for three hours at a temperature ranging from 120° C. to 130° C. After lowering the temperature, the reaction liquid was released into a 30% aqueous solution of sodium chloride. Then, the deposited crystals were filtered and dried, after which they were refined in a column chromatography with silica gel (a product of Wako Junyaku Kogyo Kabushiki Kaisha, under a tradename of "C-200") as a carrier, and chloroform as a separating solvent, by which impurities were removed. As the result, there was obtained 540 mg of a compound represented by the following structural formula:

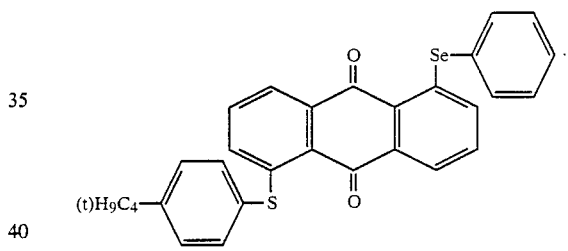

This compound indicated its melting point in a range of from 222.0° C. to 223.0° C.

The anthraquinone type compound (pigment) according to the present invention which had been obtained in the above-described process steps was added to the afore-mentioned mixed liquid crystal ZLI-1565 (the tradename of the product of Merck & Co.), and the batch was heated to a temperature of 70° C. or higher, followed by agitating the same when it assumed a state of isotropic liquid, after which the mixture was left to cool. These process steps were repeated to well dissolve the above-mentioned compound (pigment) into the liquid crystal.

The maximum absorbing wavelength (λ max) and order parameter S of the thus prepared liquid crystal composition according to the present invention were measured and calculated in the same manner as in Example 1 above.

The results from the above calculation are shown in No. 2-1 of Table 3 below.

EXAMPLE 4

To 30 ml of NMP solution, into which 0.45 g of potassium hydroxide had been dissolved, there were added 1.14 g of selenophenol and 2.0 g of a compound represented by the following structural formula:

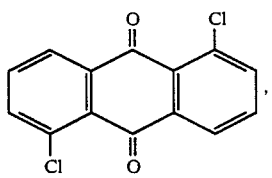

and the batch was agitated for three hours at a temperature ranging from 120° C. to 130° C. After lowering the temperature, the reaction liquid was released into a 30% aqueous solution of sodium chloride. Then, the deposited crystals were filtered and dried, after which they were refined in a column chromatography with silica gel (a product of Wako Junyaku-Kogyo Kabushiki Kaisha, under a tradename of "C-200") as a carrier, and chloroform as a separating solvent, by which impurities were removed. As the result, there was obtained 260 mg of a compound represented by the following structural formula:

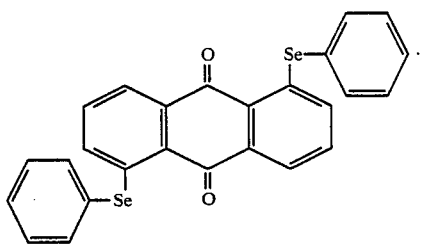

This compounds indicated its melting point in a range of from 259.0° C. to 260.0° C.

The anthraquinone type compound (pigment) according to the present invention which had been obtained in the above-described process steps was added to the afore-mentioned mixed liquid crystal ZLI-1565 (the tradename of the product of Merck & Co.), and the pigment compound was dissolved into the liquid crystal in the same manner as in Example 1 above.

Using the thus prepared liquid crystal composition according to the present invention, the maximum absorbing wavelength (λ max) and the order parameter S thereof were measured and calculated in the same manner as in Example 1 above.

The results from the above calculation are shown in No. 2-2 of Table 3 below.

EXAMPLE 5

By the method as described in Example 3 above, there were produced and isolated the anthraquinone type compounds (pigments) according to the present invention, each having the structural formula as shown in No. 2-3 to No. 2-31 of Table 3 below. Using the thus obtained 29 pigment compounds, the maximum absorbing wavelengths (λ max) and the order parameters S thereof were measured and calculated in the same manner as in Example 1 above.

The results from the above calculations are shown in No. 2-3 through No. 2-31 of Table 3 below.

TABLE 3

An anthraquinone type compound of the above-indicated general formula (III):

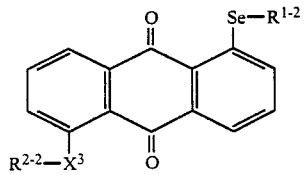

| No. | $X^3$ | $-R^{1-2}$ | $-R^{2-2}$ | λ max (nm) | Order parameter (S) |
|---|---|---|---|---|---|
| 2-1 | S | –phenyl | –phenyl–$C_4H_9(t)$ | 475 | 0.72 |
| 2-2 | Se | –phenyl | –phenyl | 487 | 0.72 |
| 2-3 | S | –phenyl | –phenyl–$CH_3$ | 475 | 0.71 |
| 2-4 | S | –phenyl | –phenyl–$C_4H_9(n)$ | 475 | 0.72 |

TABLE 3-continued
An anthraquinone type compound of the above-indicated general formula (III):
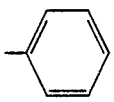
| No. | X³ | Structural Formula —R¹⁻² | —R²⁻² | λ max (nm) | Order parameter (S) |
|---|---|---|---|---|---|
| 2-5 | S | 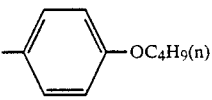 | 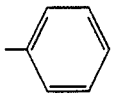—OC₄H₉(n) | 475 | 0.72 |
| 2-6 | S | 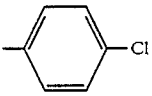 | 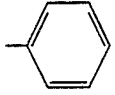—Cl | 477 | 0.71 |
| 2-7 | S | 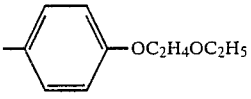 | 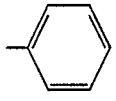—OC₂H₄OC₂H₅ | 475 | 0.72 |
| 2-8 | S | 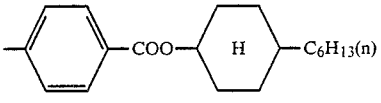 | 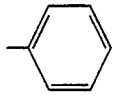—COO—⟨H⟩—C₆H₁₃(n) | 472 | 0.74 |
| 2-9 | S | 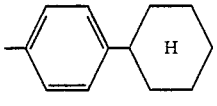 | 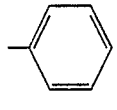 | 475 | 0.73 |
| 2-10 | S | 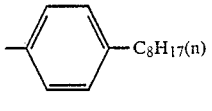 | 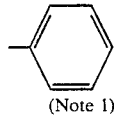—C₈H₁₇(n) | 475 | 0.72 |
| 2-11 | S | 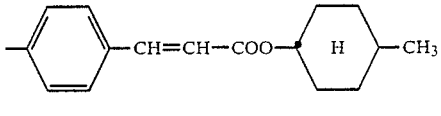<br>(Note 1) | 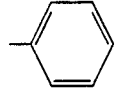—CH=CH—COO—⟨H⟩—CH₃ | 476 | 0.74 |
| 2-12 | S | 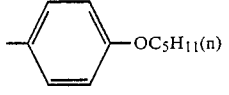 | 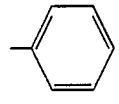—OC₅H₁₁(n) | 475 | 0.72 |
| 2-13 | S | 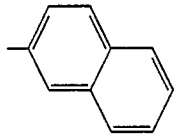 | 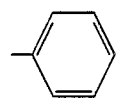 | 474 | 0.74 |
| 2-14 | S | 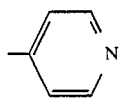 | (pyridyl) | 470 | 0.72 |

TABLE 3-continued

An anthraquinone type compound of the above-indicated general formula (III):

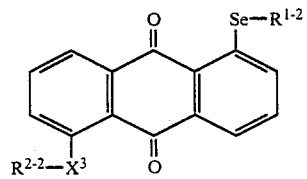

| No. | X³ | Structural Formula —R¹⁻² | —R²⁻² | λ max (nm) | Order parameter (S) |
|---|---|---|---|---|---|
| 2-15 | S | —C₆H₅ (phenyl) | 2-pyridyl | 474 | 0.72 |
| 2-16 | S | —C₆H₅ (phenyl) | pyrimidinyl | 469 | 0.71 |
| 2-17 | S | —C₆H₅ (phenyl) | methyl-pyrimidinyl | 470 | 0.71 |
| 2-18 | S | —C₆H₄—C₄H₉(n) | —C₆H₄—C₄H₉(t) | 475 | 0.73 |
| 2-19 | S | —C₆H₄—CH₃ | —C₆H₄—C₄H₉(t) | 475 | 0.73 |
| 2-20 | S | —C₆H₄—C₄H₉(t) | —C₆H₄—CH₃ | 476 | 0.73 |
| 2-21 | Se | —C₆H₄—C₄H₉(n) | —C₆H₄—C₄H₉(n) | 489 | 0.73 |
| 2-22 | Se | —C₆H₄—CH₃ | —C₆H₅ | 488 | 0.72 |
| 2-23 | Se | —C₆H₄—CH₃ | —C₆H₄—C₄H₉(n) | 489 | 0.73 |
| 2-24 | Se | —C₆H₄—CH₃ | —C₆H₄—CH₃ | 489 | 0.73 |

TABLE 3-continued

An anthraquinone type compound of the above-indicated general formula (III):

$$\text{R}^{2\text{-}2}-\text{X}^3 \text{ — anthraquinone — Se} - \text{R}^{1\text{-}2}$$

| No. | $X^3$ | $-R^{1\text{-}2}$ | $-R^{2\text{-}2}$ | λ max (nm) | Order parameter (S) |
|---|---|---|---|---|---|
| 2-25 | S | -C$_6$H$_4$-F | 2-naphthyl | 475 | 0.75 |
| 2-26 | S | -C$_6$H$_4$-Cl | -C$_6$H$_4$-C$_4$H$_9$(t) | 475 | 0.73 |
| 2-27 | S | -C$_6$H$_3$(CH$_3$)$_2$ (2,4) | -C$_6$H$_4$-CH$_3$ | 475 | 0.73 |
| 2-28 | S | -C$_6$H$_4$-COOCH$_3$ | -C$_6$H$_4$-OC$_5$H$_{11}$(n) | 475 | 0.73 |
| 2-29 | S | -C$_6$H$_4$-OC$_2$H$_5$ | -C$_6$H$_4$-C$_4$H$_9$(t) | 475 | 0.73 |
| 2-30 | S | -C$_6$H$_4$-OCH$_3$ (m) | 2-naphthyl | 475 | 0.75 |
| 2-31 | S | -C$_6$H$_3$(CH$_3$)$_2$ (2,5) | 2-naphthyl | 475 | 0.75 |

(Note 1: ⟨H⟩ denotes trans-cyclohexyl.)

EXAMPLE 6

To 20 ml of N-methylpyrrolidone solution (hereinafter abbreviated as "NMP"), into which 180 mg of potassium hydroxide had been dissolved, there were added 520 mg of p-t-butylthiophenol and 1.0 g of a compound represented by the following structural formula:

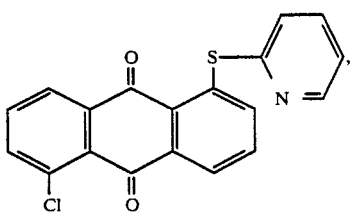

and the batch was agitated for three hours at a temperature ranging from 120° C. to 130° C. After lowering the temperature, the reaction liquid was released into a 30% aqueous solution of sodium chloride. Then, the deposited crystals were filtered and dried, after which they were refined in a column chromatography with silica gel (a product of Wako Junyaku Kogyo Kabushiki Kaisha, under a tradename of "C-200") as a carrier, and chloroform as a separating solvent, by which impurities were removed. As the result, there was obtained 450 mg of a compound represented by the following structural formula:

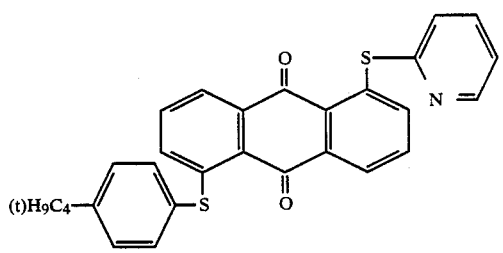

This compound indicated its melting point in a range of from 206.0° C. to 207.0° C.

The anthraquinone type compound (pigment) according to the present invention which had been obtained in the above-described-process steps was added to the afore-mentioned mixed liquid crystal ZLI-1565 (the tradename of the product of Merck & Co.), and the batch was heated to a temperature of 70° C. or higher, followed by agitating the same when it assumed a state of isotropic liquid, after which the mixture was left to cool. These process steps were repeated to sufficiently dissolve the above-mentioned compound (pigment) into the liquid crystal.

The maximum absorbing wavelength ($\lambda$ max) and the order parameter S of the thus prepared liquid crystal composition according to the present invention were measured and calculated in the same manner as in Example 1 above.

The results from the above calculation are shown in No. 3-1 of Table 4 below.

EXAMPLE 7

To 20 ml of NMP solution, into which 120 mg of potassium hydroxide had been dissolved, there were added 360 mg of p-t-butylthiophenol and 700 mg of a compound represented by the following structural formula:

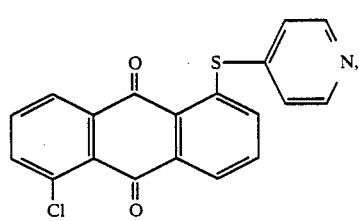

and the batch was agitated for three hours at a temperature ranging from 120° C. to 130° C. After lowering the temperature, the reaction liquid was released into a 30% aqueous solution of sodium chloride. Then, the deposited crystals were filtered and dried, after which they were refined in a column chromatography with silica gel (a product of Wako Junyaku Kogyo Kabushiki Kaisha, under a tradename of "C-200") as a carrier, and chloroform as a separating solvent, by which impurities were removed. As the result, there was obtained 360 mg of compound represented by the following structural formula:

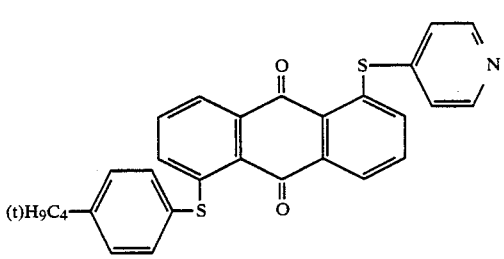

This compound indicated its melting point in a range of from 229.5° C. to 230.0° C.

The anthraquinone type compound (pigment) according to the present invention which had been obtained in the above-described process steps was added to the afore-mentioned mixed liquid crystal ZLI-1565 (the tradename of the product of Merck & Co.), and the pigment compound was dissolved into the liquid crystal in the same manner as in Example 1 above.

Using the thus prepared liquid crystal composition according to the present invention, the maximum absorbing wavelength ($\lambda$ max) and the order parameter S thereof were measured and calculated in the same manner as in Example 1 above.

The results from the above calculation are shown in No. 3-2 of Table 4 below.

EXAMPLE 8

To 20 ml of the NMP solution, into which 180 mg of potassium hydroxide had been dissolved, there were added 540 mg of p-t-butylthiophenol and 1.0 g of a compound represented by the following structural formula:

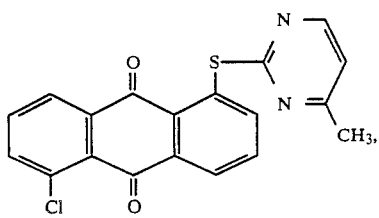

and the batch was agitated for three hours at a temperature ranging from 120° C. to 130° C. After lowering the temperature, the reaction liquid was released into a 30% aqueous solution of sodium chloride. Then, the deposited crystals were filtered and dried, after which they were refined in a column chromatography with silica gel (a product of Wako Junyaku Kogyo Kabushiki Kaisha, under a tradename of "C-200") as a carrier, and chloroform as a separating solvent, by which impurities were removed. As the result, there was obtained 380 mg of a compound represented by the following structural formula:

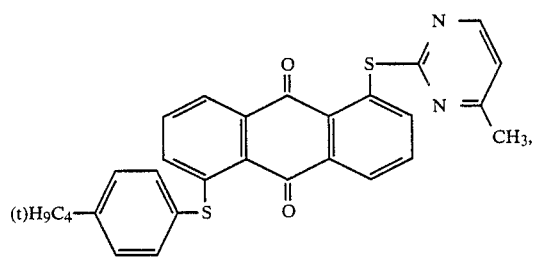

This compound indicated its melting point in a range of from 208.0° C. to 209.0° C.

The anthraquinone type compound (pigment) according to the present invention which had been obtained in the above-described process steps was added to the afore-mentioned mixed liquid crystal ZLI-1565 (the tradename of the product of Merck & Co.), and the pigment compound was dissolved into the liquid crystal in the same manner as in Example 1 above.

Using the thus prepared liquid crystal composition according to the present invention, the maximum absorbing wavelength (λ max) and the order parameter S thereof were measured and calculated in the same manner as in Example 1 above.

The results from the above calculation are shown in No. 3-3 of Table 4 below.

EXAMPLE 9

By the method as described in Example 6 above, there were produced and isolated the anthraquinone type compounds (pigments) according to the present invention, each having the structural formula as shown in No. 3-4 to No. 3-22 of Table 4 below. Using the thus obtained 19 pigment compounds, the maximum absorbing wavelengths (λ max) and the order parameters S thereof were measured and calculated in the same manner as in Example 1 above.

The results from the above calculations are shown in No. 3-4 through No. 3-22 of Table 4 below.

TABLE 4

An anthraquinone type compound of the above-indicated general formula (IV):

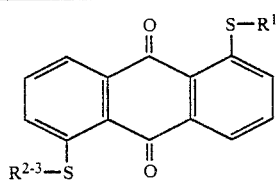 (IV)

| No. | $-R^{1-3}$ | $-R^{2-3}$ | λ max (nm) | Order parameter (S) |
|---|---|---|---|---|
| 3-1 | 2-pyridyl | -C₆H₄-C₄H₉(t) | 463 | 0.74 |
| 3-2 | 4-pyridyl | -C₆H₄-C₄H₉(t) | 458 | 0.75 |
| 3-3 | 4-methyl-2-pyrimidinyl | -C₆H₄-C₄H₉(t) | 446 | 0.75 |

TABLE 4-continued
An anthraquinone type compound of the above-indicated general formula (IV):
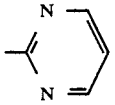
| No. | Structural Formula −R$^{1\text{-}3}$ | −R$^{2\text{-}3}$ | λ max (nm) | Order parameter (S) |
|---|---|---|---|---|
| 3-4 | 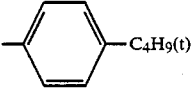 | 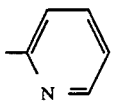 —C$_4$H$_9$(t) | 445 | 0.75 |
| 3-5 | 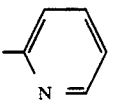 | 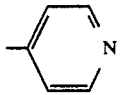 | 462 | 0.73 |
| 3-6 | 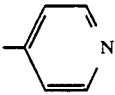 | 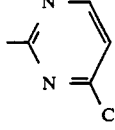 | 456 | 0.74 |
| 3-7 | 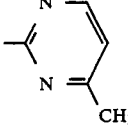 | 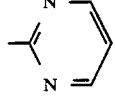 | 438 | 0.74 |
| 3-8 | 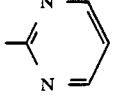 | 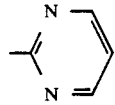 | 437 | 0.74 |
| 3-9 | 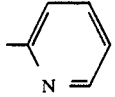 | 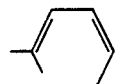 | 456 | 0.74 |
| 3-10 | 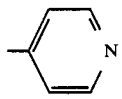 | 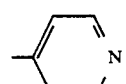 | 460 | 0.74 |
| 3-11 | 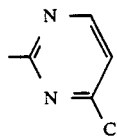 | 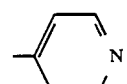 | 452 | 0.74 |
| 3-12 | 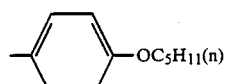 | 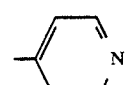 —OC$_5$H$_{11}$(n) | 458 | 0.75 |
| 3-13 | 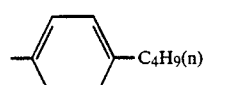 | —C$_4$H$_9$(n) | 458 | 0.75 |

TABLE 4-continued

An anthraquinone type compound of the above-indicated general formula (IV):

$$\text{(IV)}$$

(Structure: anthraquinone with S—R$^{1-3}$ at position 1 and R$^{2-3}$—S at position 5)

| No. | —R$^{1-3}$ | —R$^{2-3}$ | λ max (nm) | Order parameter (S) |
|---|---|---|---|---|
| 3-14 | 4-pyridyl | —C$_6$H$_4$—OC$_2$H$_4$OC$_2$H$_5$ | 458 | 0.75 |
| 3-15 | 2-pyridyl | —C$_6$H$_4$—C$_6$H$_4$—C$_7$H$_{15}$(n) | 465 | 0.75 |
| 3-16 | 2-pyridyl | —C$_6$H$_4$—C$_7$H$_{15}$(n) | 463 | 0.74 |
| 3-17 | 4-pyridyl | —C$_6$H$_4$—CH=CH—COO—C$_6$H$_4$—C$_4$H$_9$(n) | 459 | 0.77 |
| 3-18 | 2-pyridyl | —C$_6$H$_4$—COO—(trans-cyclohexyl)—C$_8$H$_{17}$(n) (Note: 1) | 460 | 0.76 |
| 3-19 | pyrimidyl | —C$_6$H$_4$—F | 447 | 0.74 |
| 3-20 | methyl-pyrimidyl | —C$_6$H$_4$—CH=CH—COOC$_2$H$_4$OC$_2$H$_5$ | 447 | 0.76 |
| 3-21 | pyrimidyl | —C$_6$H$_4$—C$_4$H$_9$(n) | 445 | 0.75 |
| 3-22 | methyl-pyrimidyl | —C$_6$H$_5$ | 445 | 0.74 |

(Note 1: —⟨H-cyclohexyl-H⟩— denotes trans-cyclohexyl.)

EXAMPLE 10

To 30 ml of NMP (N-methylpyrrolidone) solution, into which 0.18 g of potassium hydroxide had been dissolved, there were added 0.48 g of 1,2,3,4-tetrahydronaphthalene-6-thiol and 1.0 g of a compound represented by the following structural formula:

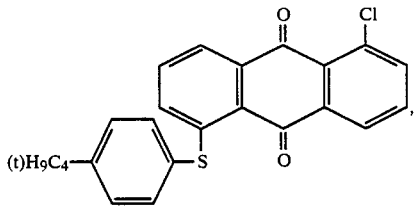

and then the batch was agitated for three hours at a temperature ranging from 120° C. to 130° C. After lowering the temperature, the reaction liquid was released into a 30% aqueous solution of sodium chloride. Then, the deposited crystals were filtered and dried, after which they were refined in a column chromatography with silica gel (a product of Wako Junyaku Kogyo Kabushiki Kaisha, under a tradename of "C-200") as a carrier, and a mixture of chloroform and n-hexane as a separating solvent, by which impurities were removed. As the result, there was obtained 38 mg of the anthraquinone type compound according to the present invention represented by the following structural formula:

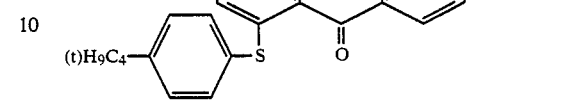

This compound indicated its melting point in a range of from 297.0° C. to 298.0° C.

The thus obtained compound was added to the aforementioned mixed liquid crystal ZLI-1565, and the batch was heated to a temperature of 70° C. or higher, followed by agitating the same when it assumed a state of isotropic liquid, after which the mixture was left to cool. These process steps were repeated to sufficiently dissolve the above-mentioned compound (pigment) into the liquid crystal.

The maximum absorbing wavelength ($\lambda$ max) and the order parameter S of the thus prepared liquid crystal composition according to the present invention were measured and calculated in the same manner as in Example 1 above.

The results from the above calculation are shown in Table 5 below.

EXAMPLE 11

By the same method as described in Example 10 above, there was produced the anthraquinone type compound according to the present invention as shown in Table 5 below. Then, the maximum absorbing wavelength and the order parameter S of the compound isolated by the same operations as described above were measured, the results of which are also shown in Table 5.

TABLE 5

An anthraquinone type compound of the above-indicated general formula (V):

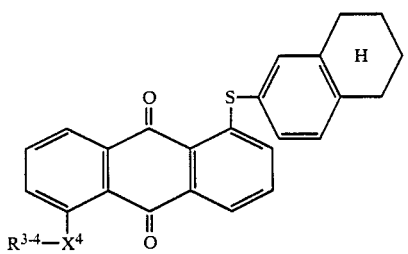

(V)

| Ex. | $X^4$ | $-R^{2-4}$ | (nm) $\lambda$ max | Order parameter (S) |
|---|---|---|---|---|
| 4-1 | S | —⟨⟩—C$_4$H$_9$(t) | 465 | 0.78 |
| 4-2 | S | —⟨⟩—C$_4$H$_9$(n) | 465 | 0.77 |

TABLE 5-continued
An anthraquinone type compound of the above-indicated general formula (V):
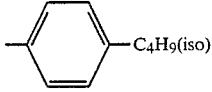
(V)
| Ex. | X⁴ | —R²⁻⁴ | (nm) λ max | Order parameter (S) |
|---|---|---|---|---|
| 4-3 | S | 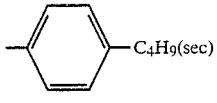 —C₄H₉(iso) | 465 | 0.77 |
| 4-4 | S | 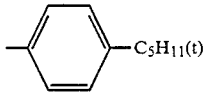 —C₄H₉(sec) | 465 | 0.77 |
| 4-5 | S | 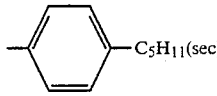 —C₅H₁₁(t) | 465 | 0.78 |
| 4-6 | S | 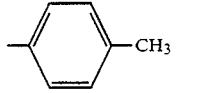 —C₅H₁₁(sec) | 465 | 0.77 |
| 4-7 | S | 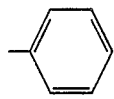 —CH₃ | 465 | 0.76 |
| 4-8 | S | 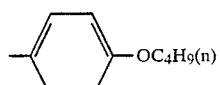 | 464 | 0.75 |
| 4-9 | S | 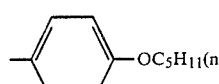 —OC₄H₉(n) | 465 | 0.78 |
| 4-10 | S | 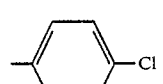 —OC₅H₁₁(n) | 465 | 0.78 |
| 4-11 | S | 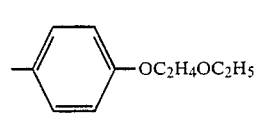 —Cl | 467 | 0.76 |
| 4-12 | S | —OC₂H₄OC₂H₅ | 465 | 0.78 |

TABLE 5-continued

An anthraquinone type compound of the above-indicated general formula (V):

(V)

[Structure: anthraquinone with S-tetrahydronaphthyl(H) substituent at one position and R³⁻⁴—X⁴ at another]

| Ex. | X⁴ | —R²⁻⁴ | (nm) λ max | Order parameter (S) |
|---|---|---|---|---|
| 4-13 | S | —C₆H₄—cyclohexyl(H) | 465 | 0.78 |
| 4-14 | S | —C₆H₄—C₈H₁₇(n) | 465 | 0.77 |
| 4-15 | S | —tetrahydronaphthyl(H) | 465 | 0.78 |
| 4-16 | S | —2-pyridyl | 464 | 0.73 |
| 4-17 | S | —4-pyridyl | 460 | 0.72 |
| 4-18 | S | —pyrimidinyl | 459 | 0.72 |
| 4-19 | S | —(methyl-pyrimidinyl)—CH₃ | 460 | 0.72 |
| 4-20 | S | —C₆H₄—COO—cyclohexyl(H)—C₆H₁₃(n) | 462 | 0.78 |
| 4-21 | S | —C₆H₄—CH=CH—COO—cyclohexyl(H)—C₂H₅ | 466 | 0.78 |

TABLE 5-continued
An anthraquinone type compound of the above-indicated general formula (V):
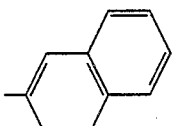
(V)
| Ex. | X⁴ | —R²⁻⁴ | (nm) λ max | Order parameter (S) |
|---|---|---|---|---|
| 4-22 | S | 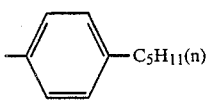 2-naphthyl | 464 | 0.78 |
| 4-23 | S | 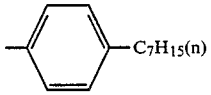 —C₅H₁₁(n) | 465 | 0.77 |
| 4-24 | S | 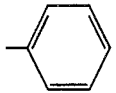 —C₇H₁₅(n) | 465 | 0.77 |
| 4-25 | Se | phenyl | 475 | 0.74 |
| 4-26 | S | —C₆H₄—COOC₇H₁₅(n) | 462 | 0.78 |
| 4-27 | S | —C₆H₄—COO(CH₂CH₂O)₂C₂H₅ | 462 | 0.78 |
| 4-28 | S | —C₆H₄—CH=CH—COO—C₆H₄—C₄H₉(n) | 466 | 0.78 |
| 4-29 | S | —C₆H₄—COO—cyclohexyl | 462 | 0.78 |
| 4-30 | S | —C₆H₄—C₆H₄—OC₄H₉(n) | 466 | 0.78 |
| 4-31 | S | —C₆H₄—C₆H₅ (biphenyl) | 465 | 0.78 |

TABLE 5-continued

An anthraquinone type compound of the above-indicated general formula (V):

(V)

| Ex. | X⁴ | —R²⁻⁴ | (nm) λ max | Order parameter (S) |
|---|---|---|---|---|
| 4-32 | S | 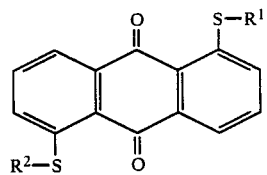 —C₄H₉(n) | 465 | 0.78 |
| 4-33 | S | 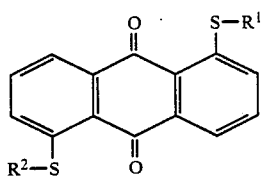 —COO— ⌬ —OC₃H₇(n) | 462 | 0.78 |

(Note: —⌬ H ⌬— denotes trans-cyclohexyl.)

INDUSTRIAL APPLICABILITY

The novel anthraquinone type compound according to the present invention which forms yellow to orange-colored hue exhibits good solubility to liquid crystal, and the liquid crystal composition according to the present invention, which is obtained by dissolving the compound into the liquid crystal, has high dichroic ratio and has its value of the order parameter S of being closer to 1, hence it is capable of providing clear color display of bright and high contrast of the displayed image.

We claim:

1. An anthraquinone type compound which is represented by the following general formula wherein $R^1$ represents a pyridyl group, a pyrimidyl group or a lower alkyl substituted pyrimidyl group and $R^2$ indicates a 4-substituted phenyl group selected from the group consisting of a 4-alkyl phenyl group, 4-alkoxy phenyl group, a biphenyl group, a 4-cyclohexyl-phenyl group and a trans-4-alkyl cyclohexyl phenyl group wherein said alkyl or alkoxy substituents have a carbon content of C1-18.

2. An anthraquinone type compound according to claim 1 wherein $R^1$ is pyridyl group.

3. An anthraquinone type compound according to claim 1 wherein $R^1$ is a lower alkyl-substituted pyrimidyl group.

4. An anthraquinone type compound according to claim 1, wherein alkyl and alkoxy have the carbon content of from 1 to 13.

5. An anthraquinone type compound according to claim 1, wherein $R^2$ is a phenyl group substituted by an alkoxy group, an alkyl group, a halogen, a 4-alkyl-phenyl group, a 4-alkylphenoloxycarbonyl-substituted alkenyl group, a trans-4-alkylcyclohexyloxycarbonyl group, an alkoxyalkoxycarbonyl-substituted alkenyl group or a phenyl group.

6. A composition for liquid crystal display element, which contains therein a liquid crystal and an anthraquinone type compound which is represented by the formula wherein $R^1$ represents a pyridyl group, a pyrimidyl group or a lower alkyl substituted pyrimidyl group and $R^2$ indicates a substituted phenyl group wherein said substituent is selected from the group consisting of an alkoxy group, an alkyl group, a halogen, a 4-alkyl-phenyl group, a 4-alkylphenyloxycarbonyl-substituted alkenyl group, a trans-4-alkylcyclohexyloxycarbonyl group, an alkoxyalkoxycarbonyl substituted alkenyl group and a phenyl group wherein the carbon content of said alkyl or alkoxy substituents is C1-18.

7. A composition according to claim 6, wherein $R^1$ is a pyridyl group and $R^2$ is a 4-substituted phenyl group.

8. A composition according to claim 6, wherein $R^2$ is a 4-substituted phenyl group selected from a group consisting of a 4-alkyl-phenyl-group, 4-alkoxy-phenyl group, a bisphenyl group, a 4-cyclohexyl-phenyl group and a trans-4-alkyl cyclohexyl-phenyl group.

* * * * *